UNITED STATES PATENT OFFICE.

KARL SCHICK, OF GRIESHEIM-ON-THE-MAIN, GERMANY, ASSIGNOR TO CHEMISCHE FABRIK GRIESHEIM ELECTRON, OF FRANKFORT-ON-THE-MAIN, GERMANY.

CATALYTIC BODY AND METHOD OF MAKING SAME.

971,149. Specification of Letters Patent. Patented Sept. 27, 1910.

No Drawing. Application filed June 27, 1907. Serial No. 381,170.

*To all whom it may concern:*

Be it known that I, KARL SCHICK, of Griesheim-on-the-Main, Germany, have invented certain new and useful Improvements in Catalytic Bodies and Methods of Making Same, of which the following is a specification.

It has been known for a long time that platinum, when heated to 300° centigrade, causes a mixture of air and ammonia to enter into reaction and form nitric oxids which form, with water at the same time produced, nitric acid and nitrous acid (see, for instance, Fehling, *Handwörterbuch der Chemie*, 1871, I, page 386, fourth paragraph). The platinum was used for these and other gaseous reactions in the form of spongy platinum, or platinum black, as it was supposed that the finer the platinum was divided the more capable of reacting it would be and the greater would be the yield in nitric oxids, but it was found, that the yield was poor. In using other contact bodies, such for instance, as $Fe_2O_3$ CuO, and the like, the amount of nitrogen formed is very large, and consequently the yield in nitric oxids is correspondingly poor. Ostwald proposed to use either solid platinum, or platinum thinly coated with platinum black, and these at first give good yield, as much as 93 per cent. of the nitrogen in the ammonia being oxidized, but this favorable action soon ceases and, after a comparatively short time, the yield in nitric oxids decreases and in a few weeks, the catalytic bodies become practically useless.

The present invention is based on the observation that the cause of the decrease in activity of the solid platinum and platinum coated with platinum black is due to the reaction loosening the surface of the platinum, reducing it to a condition similar to that of spongy platinum, which, as hereinbefore stated, yields but poor quantities of nitric oxids. The action of platinum sponge is probably as follows: A part of the ammonia is absorbed in the platinum sponge, or otherwise held back, and decomposed into nitrogen and hydrogen (see Fehling's *Handwörterbuch der Chemie*, I, 386, second paragraph) and therefore escapes oxidation, while the remainder of the ammonia is oxidized to nitric oxid at the surface. So long as the catalytic bodies proposed by Ostwald have a smooth surface, the platinum can absorb only small amounts of ammonia and the oxidation to nitric oxids is very efficient, but the more the surface of the platinum is converted into the condition of spongy platinum, the more ammonia is absorbed thereby and lost as far as the process is concerned.

I have, as a result of investigations and experiments, found that platinum can be satisfactorily used as the catalytic agent, if the formation of platinum sponge be prevented, or, should it form, if its gas absorbing qualities be removed. This result I attain as follows:—Platinum is, by reduction, deposited in a very thin layer of platinum black on a suitable carrier, such, for example, as quartzite, porcelain, or the like, and the contact bodies thus obtained are heated to a temperature sufficient to soften the platinum layer and cause it to unite with the body to which it is applied. The platinum black is thereby converted to microscopic small bright metallic drops and a catalytic body is obtained which is extraordinarily efficient and durable giving 93 to 95 per cent. yield. While the carrier bodies may be coated as described in several ways I prefer to rinse them in a solution of chlorid of platinum and after the liquid has evaporated bake the bodies thus coated with chlorid or platinum by exposure to a temperature of 1400° centigrade. The production of a uniformly thin layer of platinum is somewhat difficult in producing large quantities of such catalytic bodies for it requires great care in order to prevent the platinum in some places forming too thick during softening, which thick layers would result in the formation of platinum sponge with the drawback aforesaid. This can be prevented by coating the carrier with a glaze which softens easily (such as feldspar and caustic potash). The further preparation of the catalytic bodies by the method hereinbefore described does not require any special care and their duration and efficacy is unlimited as shown by protracted trials. Probably the glaze is softened by the heat of reaction during the catalytic action and penetrates into the pores of any platinum sponge that may happen to be formed, so that the said sponge loses its porosity and consequently its capacity for absorption of ammonia.

No claim is herein made to the process or method of making nitric acid by use of a contact body such as described.

Having thus described the invention, what is claimed is—

1. The herein described method of manufacturing a platinum contact body for use in manufacturing nitric acid, consisting in coating a suitable carrier with a thin layer of platinum and then heating the coated carrier to a temperature at which the platinum will be softened and caused to unite with the carrier, as and for the purpose described.

2. The herein described method of manufacturing a platinum contact body for use in manufacturing nitric acid, consisting in first coating a suitable carrier with a glaze which can be readily softened, then applying to said glazed body a thin layer of platinum, and heating the body coated as aforesaid to a temperature at which the platinum will be softened and caused to unite with the carrier, as and for the purpose set forth.

3. As an article of manufacture, a platinum contact body for use in manufacturing nitric acid, comprising a suitable carrier coated with a readily softening glaze and having a platinum layer applied thereto in the manner described, as and for the purpose set forth.

In testimony whereof I have signed my name to this specification in the presence of two subscribing witnesses.

KARL SCHICK.

Witnesses:
 FRANZ HASSLACHER,
 ERWIN DIPPEL.